United States Patent
Wang et al.

(10) Patent No.: US 12,260,107 B1
(45) Date of Patent: Mar. 25, 2025

(54) EFFICIENT HANDLING OF DATA PURGE REQUESTS

(71) Applicant: SAP SE, Walldorf (DE)

(72) Inventors: Lei Wang, Shanghai (CN); Fen Li, Shanghai (CN); Haipeng Wu, Shanghai (CN); Yunfeng Jiang, Shanghai (CN); Lai Wei, Shanghai (CN); Feng Zhang, Shanghai (CN)

(73) Assignee: SAP SE, Walldorf (DE)

( * ) Notice: Subject to any disclaimer, the term of this patent is extended or adjusted under 35 U.S.C. 154(b) by 27 days.

(21) Appl. No.: 18/371,660

(22) Filed: Sep. 22, 2023

(51) Int. Cl.
*G06F 3/06* (2006.01)

(52) U.S. Cl.
CPC .......... *G06F 3/0652* (2013.01); *G06F 3/0604* (2013.01); *G06F 3/067* (2013.01)

(58) Field of Classification Search
CPC ....... G06F 3/0652; G06F 3/0604; G06F 3/067
See application file for complete search history.

(56) References Cited

U.S. PATENT DOCUMENTS

| | | | |
|---|---|---|---|
| 2017/0195405 A1* | 7/2017 | Bergman | H04L 67/06 |
| 2018/0107709 A1* | 4/2018 | Spiess | G06F 16/2428 |
| 2018/0314462 A1* | 11/2018 | Katayama | G06F 3/0683 |
| 2023/0195720 A1* | 6/2023 | McConnell | G06F 16/27 |
| | | | 707/694 |

* cited by examiner

Primary Examiner — Francisco A Grullon
(74) Attorney, Agent, or Firm — SCHWEGMAN LUNDBERG & WOESSNER, P.A.

(57) ABSTRACT

Systems and methods described herein relate to the efficient handling of data purge requests in the context of a distributed storage system. A plurality of data purge requests is stored in a first data structure. The data purge requests may be grouped into batches that are processed at least partially in parallel. A first data purge request from the plurality of data purge requests is successfully processed, and is moved from the first data structure to a second data structure. Processing of a second data purge request from the plurality of data purge requests is unsuccessful. The second data purge request is retained in the first data structure. Purge status data is generated based on the first data purge request being in the second data structure and the second data purge request being in the first data structure. The purge status data may be presented at a user device.

20 Claims, 9 Drawing Sheets

EFFICIENT HANDLING OF DATA PURGE REQUESTS

TECHNICAL FIELD

The subject matter disclosed herein generally relates to data purging. More specifically, but not exclusively, the subject matter relates to the processing of data purge requests in the context of a distributed storage system.

BACKGROUND

Data purging refers to a process of deleting or removing data completely from a system or device. Data purging may involve permanently removing data from all systems, including backup systems, in such a manner that the data is not recoverable. The effective handling of data purge requests is an important task in many business environments, e.g., to free up storage space, to reduce costs, or to ensure compliance with data retention policies or data regulations.

In a traditional relational database, data purge requests can be handled by setting a column as a status flag and using write operations for status adjustments without having a significant impact on read operations. However, in some distributed storage systems, and particularly distributed file-based storage systems, such as a Hadoop Distributed File System (HFDS), write operations of this nature may be relatively expensive and resource-intensive, potentially impacting read performance. Furthermore, rewriting of files, particularly main data files, may cause or exacerbate fragmentation in the distributed storage system.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
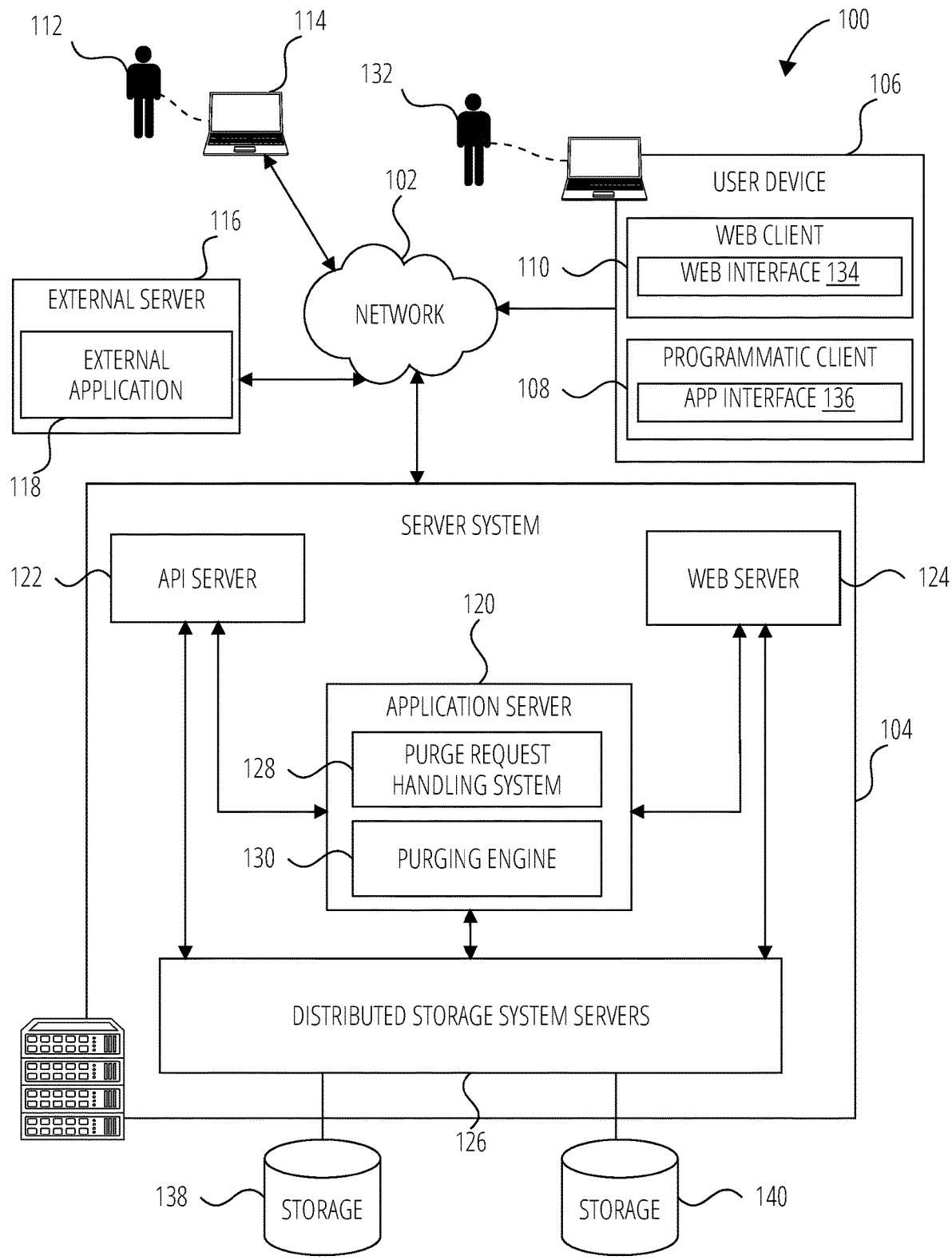
FIG. 1 is a diagrammatic representation of a network environment that includes a purge request handling system, according to some examples.

Systems and methods described herein allow for efficient processing of data purge requests in the context of a distributed storage system. Data purge requests are stored in data structures, such as tables, and are moved between the data structures to implement a multi-stage processing approach.

The data purge requests may be grouped based on common features and processed in at least partially parallel batches to accelerate purging. In some examples, data purge requests within a batch are optimized, e.g., by merging or combining data purge requests, to further accelerate processing and reduce fragmentation.

In some examples, successful and failed data purge requests are tracked in separate data structures. Failed batches may be automatically retried, e.g., a fixed number of times. A monitoring interface may be provided to display a real-time status for one or more data purge requests.

A method may include storing a plurality of data purge requests in a first data structure. The data purge requests may each relate to data stored in a distributed storage system. For example, a data purge request may identify specific data within one or more files of a HDFS to be purged. Data purge requests that are successfully processed are moved from the first data structure to a second data structure. Data purge requests that are not successfully processed are retained in the first data structure.

For example, processing of a first data purge request is successful and processing of a second data purge request is unsuccessful. The first data purge request is moved to the second data structure, while the second data purge request is retained in the first data structure. Purge status data may be generated, e.g., based on the first data purge request being in the second data structure and the second data purge request being in the first data structure.

In some examples, a third data structure may be provided. Data purge requests may be stored in the third data structure in an ingestion stage and moved to the first data structure for processing. The first data structure may store data purge requests that are in a processing stage, while the second data structure stores successfully processed data purge requests. In some examples, a data purge request only appears in one of the aforementioned data structures at a given point in time.

The purge status data may include one or more of a status of the first data purge request, a status of the second data purge request, or a status of a third data purge request that is located in the third data structure. The status of the first data purge request indicates successful processing, the status of the second data purge request indicates that the second data purge request is in the processing stage, and the status of the third data purge request indicates that the third data purge request is in the ingestion stage.

A system may access the second data structure to identify the status of the first data purge request, access the first data structure to identify the status of the second data purge request, or access the third data structure to identify the status of a third data purge request. In some examples, a user interface, such as a monitoring GUI, is provided to present the purge status data at a user device, e.g., a user device of an end user or a system administrator. The status of each data purge request can be easily tracked or monitored, e.g., by using the system to check the data structure in which the data purge request is located, as described further below.

The data structures may include tables. In some examples, the first data structure is a request staging table, the second data structure is a completed request table, and the third data structure is a raw request table. The data structures may be stored in the distributed storage system.

In some examples, new data purge requests are stored in the raw request table when initially received, e.g., from a user device of a customer or a system administrator. Prior to processing, data purge requests are moved from the raw request table to the request staging table. While in the request staging table, data purge requests may be batched or optimized and then processed. Batching or optimization may allow for improved efficiencies; e.g., this may allow a purging engine to complete purging operations more rapidly. After a purging operation, a data purge request is moved to the completed request table if it was successfully purged. If not, the data purge request is retained in the request staging table to allow for one or more retries of the purging operation.

A system as described herein may automatically cause processing of a data purge request, e.g., the second data purge request mentioned above, to be retried responsive to the retaining of the data purge request in the first data structure. If the system detects that the retrying of the processing of the data purge request failed a predetermined number of times, the system may cause transmission of a message indicating that the processing of the second data purge request failed. For example, the message may be an alert that is transmitted to a user device of a system administrator to request manual intervention in the purging operation.

The system may include a purging engine to execute, in the distributed storage system, purging of data associated with respective data purge requests from the plurality of data purge requests. The purging engine may obtain the data purge requests to process from the relevant data structure, e.g., the first data structure as mentioned above. The detection of unsuccessful processing of a data purge request may include detecting that the purging engine failed to successfully purge data identified by a data purge request from the distributed storage system.

As mentioned, data purge requests may be grouped or optimized prior to initiating processing of the data purge requests. A method may include grouping data purge requests based on at least one feature, e.g., common features such as timestamps or modules from which the data purge requests originate, to obtain batches of data purge requests. The batches may then be processed at least partially in parallel, e.g., by sending batches simultaneously to the purging engine for purging. The system may monitor purging resource utilization, e.g., purging load, and adaptively control a level of parallel processing based on purging resource utilization.

Optimization steps may include merging two or more data purge requests. For example, a first data purge request may cover all data to be purged by a second data purge request, and the first data purge request may be combined with the second data purge request to improve system speed and efficiency (e.g., by removing redundant requests or overall purging steps required). This may also reduce fragmentation issues.

In at least some distributed storage systems, such as HDFS implementations or other file-based distributed storage systems, purging specific data may be challenging, as this may cause file fragmentation or reduce read performance. For example, a system may be able to remove all data prior to a given date relatively easily and without significant issues, but the targeted purging of more specific data, e.g., employee records matching certain criteria, may cause challenges such as those mentioned above.

Examples described herein provide an efficient technique to purge data, e.g., HDFS data, and particularly targeted data purging where real-time removal is not required. The technique may involve storing purge requests in separate tables based on request status, and processing them in batches to improve efficiency. The technique may also allow for automatic retries when batches fail and for real-time monitoring of request status.

Techniques described herein utilize a multi-stage approach with separate or distinct data structures. This may overcome or alleviate technical challenges, such as slow write speeds and file fragmentation, that may arise in distributed file systems (DFSs). As mentioned, write operations may be expensive or resource-intensive, and techniques described herein may allow for greater separation between read and write operations.

In some examples, data purge requests are staged and batched prior to processing, allowing for efficient handling of such data purge requests. The use of separate data structures may make it easier to plan, execute, or automate purges.

As mentioned, while a column may be updated in a traditional relational database to mark records as needed, e.g., to mark a record as purged, similar steps in a HDFS may be more expensive and can harm system performance. Techniques described herein may obviate or alleviate such technical issues, e.g., by avoiding or reducing the need to write or rewrite directly to main data files (e.g., the actual files that are to be purged) through utilizing a multi-stage approach where records are moved between data structures (e.g., data structures separate from the main data files). This approach may be conveniently or easily integrated with existing architectures, e.g., an existing HDFS.

Examples described herein may thus improve the functioning of a computer system, e.g., an HDFS, by improving purging efficiency, reducing writing operations, separating at least some write operations from read operations, or reducing fragmentation. When the effects in this disclosure are considered in aggregate, one or more of the methodologies described herein may obviate a need for certain efforts or resources that otherwise would be involved in distributed storage systems. Computing resources utilized by systems, databases, or networks may be more efficiently utilized or reduced, e.g., as a result of increased read speeds, faster processing of data purge requests, or increased overall purging efficiency. Examples of such computing resources may include processor cycles, network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 132. The user 132 may, for example, be a customer accessing one or more products or services provided by a service provider via the server system 104. An administrator 112, e.g., an administrator associated with the service provider, may also access the server system 104 via the network 102, e.g., by using a user device 114.

A web client 110 (e.g., a browser) or a programmatic client 108 (e.g., an "app") may be hosted and executed on the user device 106. Although not shown in FIG. 1, the user device 114 of the administrator 112 may also host and execute a similar web client or programmatic client.

An Application Program Interface (API) server 122 and a web server 124 provide respective programmatic and web interfaces to components of the server system 104. A specific application server 120 hosts a purge request handling system 128 and a purging engine 130, each of which includes components, modules, or applications. Distributed storage system servers 126 host or provide access to a distributed storage system, e.g., a distributed storage system 200 as described with reference to FIG. 2.

The user device 106 can communicate with the application server 120, e.g., via the web interface supported by the web server 124 or via the programmatic interface provided by the API server 122. It will be appreciated that, although only a single user device 106 is shown in FIG. 1, a plurality of user devices may be communicatively coupled to the server system 104 in some examples. Further, while certain functions may be described herein as being performed at either the user device 106 or 114 (e.g., web client 110 or programmatic client 108) or the server system 104, the location of certain functionality either within the user device 106 or 114, or the server system 104, may be a design choice.

The application server 120 is communicatively coupled to the distributed storage system servers 126, facilitating access to one or more information storage repository, e.g., storage 138 or storage 140. The storage 138 or storage 140 may, for example, include one or more databases. In some examples, the distributed storage system servers 126 provide access to storage devices that store data to be purged by the purging engine 130, e.g., files, records, or logs. In some examples, the distributed storage system servers 126 may also be accessed by the user 132 using the user device 106 (e.g., to add new files or modify files), or by the administrator 112 using the user device 114. The distributed storage system servers 126 may be accessed directly, or via the API server 122 or web server 124, depending on the implementation.

The application server 120 accesses application data (e.g., application data stored by the distributed storage system servers 126) to provide one or more applications or software tools to the user device 106 or the user device 114, e.g., via a web interface 134 or an app interface 136. As described further below according to examples and with specific reference to FIGS. 2-6, the application server 120, using the purge request handling system 128 and the purging engine 130, may provide one or more tools or functions for handling data purge requests, performing purging operations, and enabling monitoring of purge status data.

In some examples, the server system 104 is part of a cloud-based platform provided by a software provider that allows the user 132 to utilize features of one or more of the distributed storage system servers 126, the purge request handling system 128, and the purging engine 130. The user 132 may utilize one or more software offerings of the software provider, e.g., a data storage solution, an accounting solution, a human resources module, a planning module, or an enterprise resource planning solution. A data purge request may identify the user 132 and an offering or module that the data purge request relates to, e.g., a request to purge specific employee data used in a human resources solution.

The purge request handling system 128 may enable the user 132 or the administrator 112 to submit new data purge requests, e.g., a request that specifies a specific set of data to be purged from a distributed storage system. The purge request handling system 128 may also provide one or more dashboards via a GUI on the user device 106 or the user device 114, e.g., a dashboard that allows the user 132 or administrator 112 to track, monitor, or manage data purge requests.

As mentioned, the distributed storage system servers 126 may provide access to a distributed storage system that is accessed by the purging engine 130 to purge data. Purging may be performed to free up storage space or reduce costs, and may be driven by user instructions, data retention policies, or regulatory compliance (e.g., a law requiring data to be completely removed from a system after a certain period). In some examples, the distributed storage system comprises an HDFS or other DFS. A DFS is a file system that enables clients to access file storage from multiple hosts through a computer network. Files may be spread across multiple storage servers in multiple locations. In some examples, a DFS can be designed so that geographically distributed users, such as remote workers and distributed teams, can access and share files remotely as if they were stored locally.

In use, the purging engine 130 may connect to the distributed storage system, e.g., DFS, and delete or overwrite the specific data being requested for purge. Purging operations may depend on the implementation and can include operations such as deleting files, overwriting file blocks, and updating metadata. The purging engine 130 may access data purge requests from the purge request handling system 128 and process the data purge requests, e.g., in batches. For each request, the purging engine 130 may locate the relevant files or blocks to purge based on criteria, such as timestamps, file paths, or data identifiers, and then execute the purging operation. If the purging engine 130 successfully completes purging of data associated with a request, it may notify the purge request handling system 128 that the relevant data purge request was successfully processed. On the other hand, if a purge operation (or part thereof) fails, the purging engine 130 may notify the purge request handling system 128 of the failure, e.g., together with details of the failure, such as an indication of a request within a batch of requests that failed.

One or more of the application server 120, the distributed storage system servers 126, the API server 122, the web server 124, or parts thereof, may each be implemented in a computer system, in whole or in part, as described below with respect to FIG. 9. In some examples, external applications, such as an external application 118 executing on an external server 116, can communicate with the server system 104 via the programmatic interface provided by the API server 122. For example, a third-party application may support one or more features or functions on a website or platform hosted by a third party, or may perform certain methodologies and provide input or output information to the server system 104 for further processing or publication. The external application 118 may, for example, access the distributed storage system servers 126 to view or modify files, or access the purge request handling system 128 to view the status of data purge requests.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

One or more of the components in FIG. 1 may be implemented using hardware (e.g., one or more processors of one or more machines) or a combination of hardware and software. For example, a component may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Referring again to DFS implementations, a DFS may cluster together multiple storage nodes that each have their own computing power and storage and distribute data sets across multiple nodes. In some examples, data items are replicated onto multiple servers, which enables redundancy to keep data highly available. The data on a DFS can reside on various types of storage devices, such as solid-state drives and hard disk drives, and examples described herein are not restricted to a particular type of storage device.

Figure 2:
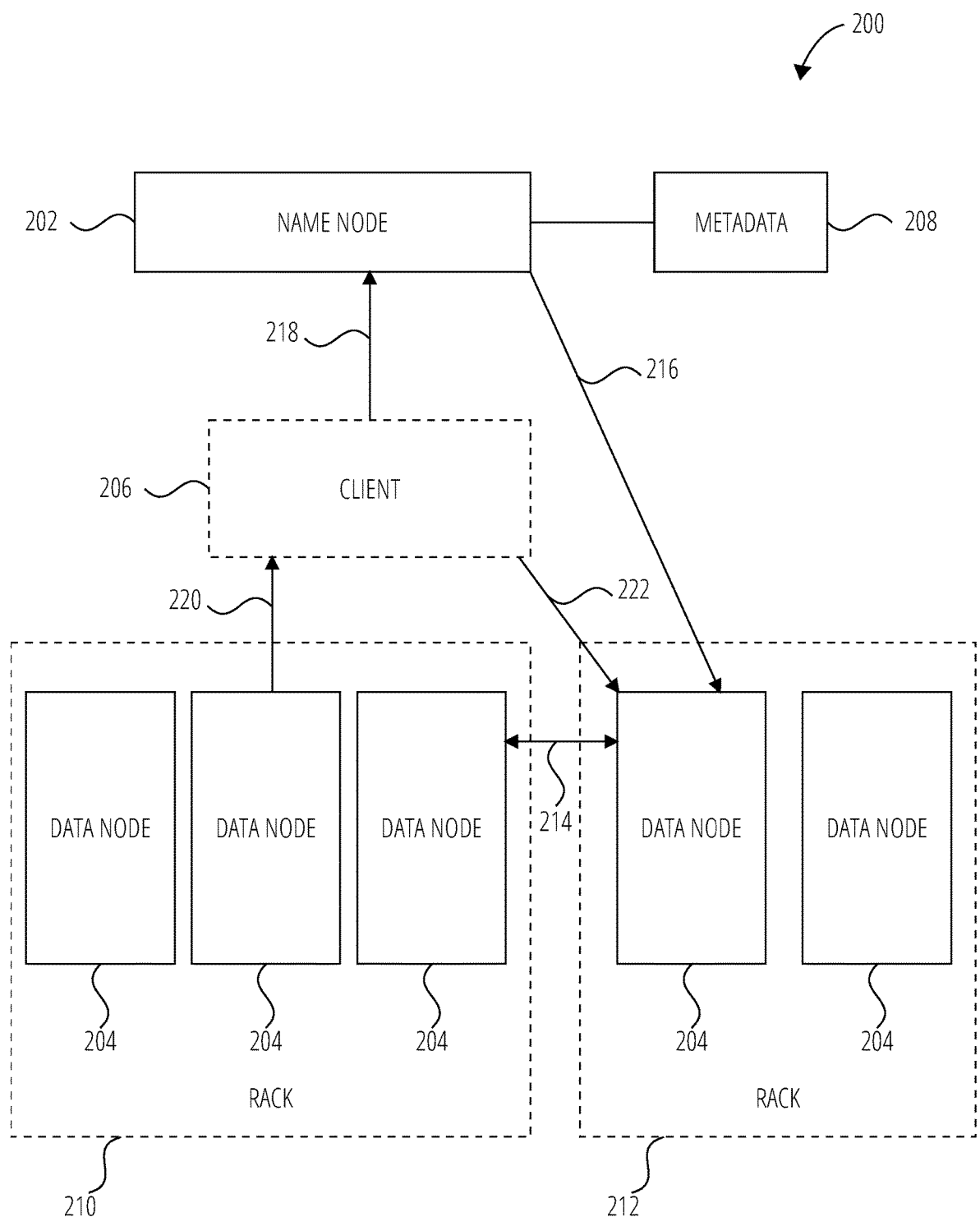
FIG. 2 is a diagrammatic representation of a distributed storage system, according to some examples.

FIG. 2 shows an architecture of a distributed storage system 200, which is provided as a non-limiting example of a DFS. It is noted that the distributed storage system servers 126 of FIG. 1 may form part of a distributed storage system, such as the distributed storage system 200 of FIG. 2.

In FIG. 2, the distributed storage system 200 has an HDFS architecture. The distributed storage system 200 comprises a name node 202 and multiple data nodes 204 that store data in blocks (not shown). The name node 202 functions as a primary server that manages the file system namespace and controls accessing of files by a client 206 (e.g., a client application running on a Hadoop cluster). The name node 202 maintains and manages the namespace, including, for example, tracking file locations, mapping blocks to data nodes 204, and managing permissions.

The name node 202 stores metadata 208 about files stored in the distributed storage system 200, including, for example, block locations, mappings, and properties. The metadata 208 enables the name node 202 to track file blocks across the data nodes 204.

In some examples, the data nodes 204 reside on hardware nodes distributed across a cluster. Data nodes 204 may be organized into racks 210, 212, with each rack 210, 212 containing one or more of the data nodes 204. For example, the data nodes 204 of a particular rack 210 may be on the same physical rack in a data center. While only five data nodes 204 and two racks 210, 212 are shown in FIG. 2 for illustrative purposes, it will be appreciated that the distributed storage system 200 may include a significantly larger number of nodes and racks.

A data node 204 serves requests from the client 206 and handles block creation, deletion, and replication 214 on instruction 216 from the name node 202. The distributed storage system 200 may replicate each data item multiple times (e.g., three times) and distribute the copies to individual data nodes 204, e.g., by placing at least one copy on a different rack 210, 212 than one or more other copies.

During operation, when the client 206 seeks to access or delete files, it first communicates with the name node 202 (e.g., by way of a metadata request 218). The name node 202 provides the client 206 with file block locations. The client 206 may then directly communicate with the data nodes 204 to perform read operations 220 or write operations 222 with respect to blocks in the data nodes 204.

The distributed storage system 200 may provide high-performance access to data, e.g., parallel processing, in a scalable manner. Data may be rapidly transferred between data nodes 204, and to and from the client 206. The name node 202 may dynamically adapt to server capacity demand by adding or removing data nodes 204 as necessary.

Data purging is an important task in many DFS systems, e.g., to reduce storage costs, organize data, or comply with legal obligations. The client 206 (e.g., where the client is the purging engine 130 of FIG. 1 or an application associated with the purging engine 130) may also use a metadata request to initiate a purging operation. The client 206 may communicate with the name node 202 to obtain metadata information from the metadata 208 and to update the metadata 208 once the purge operation is initiated. In some examples, once the name node 202 then updates the relevant metadata 208 for the purge operation, the blocks associated with the data in question will be marked for deletion on the data nodes 204. Deletion may then occur thereafter, e.g., based on predefined cycles or intervals.

As mentioned, in a traditional relational database, data purge requests can be handled by setting a column as a status flag and using write operations for status adjustments. However, in a system such as the distributed storage system 200 of FIG. 2, write operations of this nature may be relatively expensive and resource-intensive. Further, updating a column in-place in the distributed storage system 200 may cause or exacerbate fragmentation within the blocks of the distributed storage system 200. Examples disclosed herein may provide reduced write operations, better separation between write and read operations, or improve overall purging efficiency.

Figure 3:
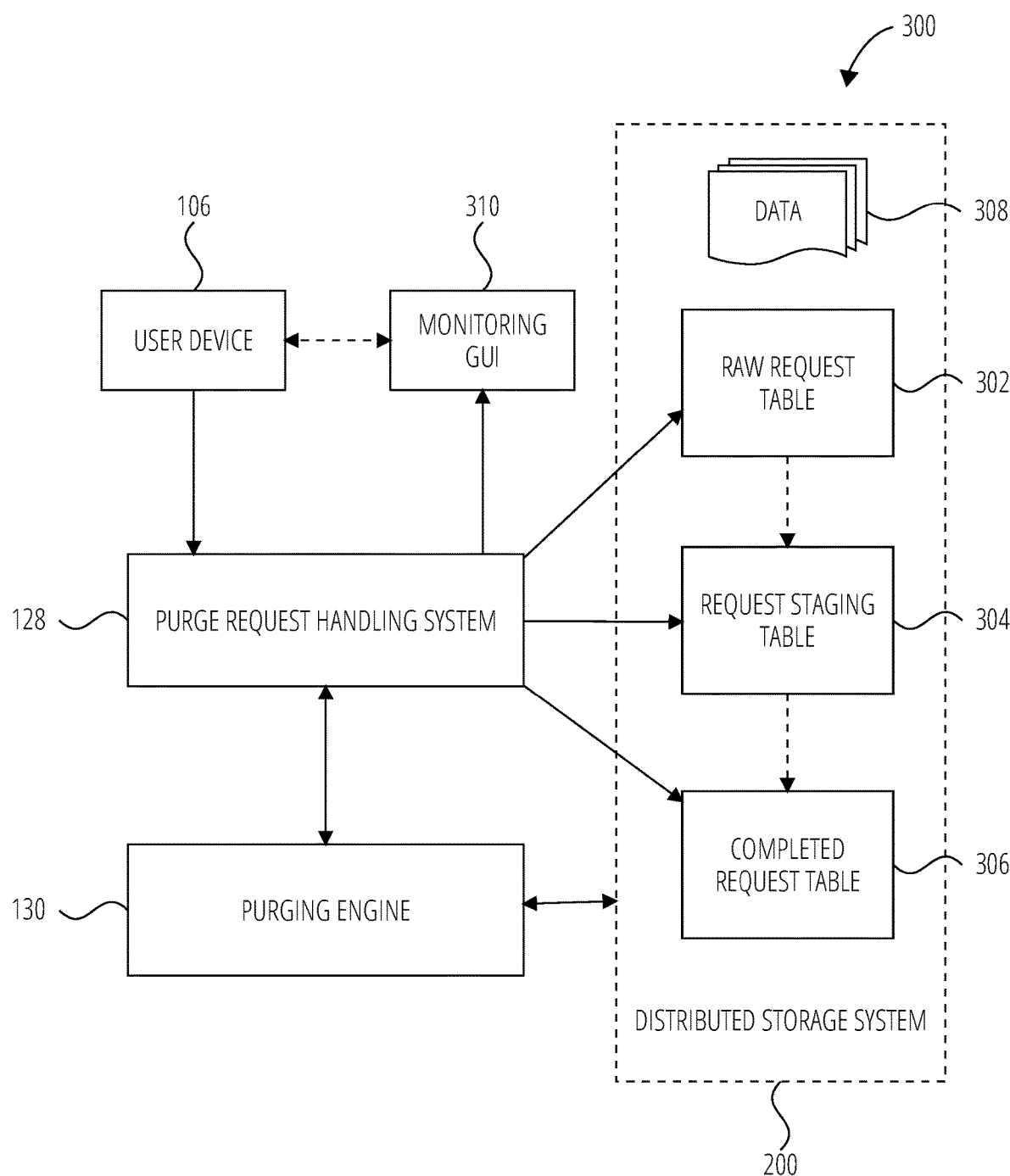
FIG. 3 is a diagrammatic representation of interactions between a user device, a purge request handling system, a purging engine, and components in a distributed storage system, according to some examples.

FIG. 3 is an interaction diagram 300 that illustrates certain interactions between a user device, a purge request handling system, a purging engine, and a distributed storage system, according to some examples. In FIG. 3, the user device, the purge request handling system, and the purging engine are the user device 106, the purge request handling system 128, and the purging engine 130 of FIG. 1, respectively. Further, in FIG. 3, the distributed storage system is the distributed storage system 200 of FIG. 2. However, it will be appreciated that operations, interactions, and features described with reference to FIG. 3 may be performed by other components, devices, systems, data structures, interfaces, or entities.

Three separate data structures are shown in FIG. 3: a raw request table 302, a request staging table 304, and a completed request table 306. It is noted that a table is a non-limiting example of a data structure, and other data structures, such as queues, arrays, linked lists, or hash tables, may also be used. As shown in FIG. 3, the raw request table 302, the request staging table 304, and the completed request table 306 may be stored in the distributed storage system 200, together with data 308 (e.g., files) that are to be purged from the distributed storage system 200. In other examples, the raw request table 302, the request staging table 304, or the completed request table 306 is not stored in the same storage system as the data to be purged.

The user device 106 transmits one or more data purge requests to the purge request handling system 128. In some examples, data purge requests may also originate from other sources, e.g., from the administrator 112 of FIG. 1, or from an automated purge scheduler component. A data purge request may identify data to be purged and may include metadata, such as details of the requestor.

The data structures shown in FIG. 3 enable the implementation of a multi-stage processing approach. The raw request table 302, the request staging table 304, and the completed request table 306 may have the same or similar general data structures, allowing for the movement of a record (e.g., a data purge request) from one of the tables to another.

The raw request table 302 stores new or incoming data purge requests. The purge request handling system 128 may add new data purge requests to the raw request table 302 as they are received, e.g., from the user device 106 or another requestor. The raw request table 302 stores data purge requests prior to processing thereof by the purging engine 130 and may thus be regarded as being in an ingestion stage when in the raw request table 302 (e.g., a request has been collected, received, or imported, but no processing or pre-processing has started).

The request staging table 304 stores data purge requests that are being processed at a given point in time. The purge request handling system 128 may automatically move data purge requests from the raw request table 302 to the request staging table 304 for processing. Requests may be optimized and batched prior to initiating purging. Requests are then sent to the purging engine 130, or retrieved by the purging engine 130, which communicates with the distributed storage system 200 to execute the purging process, e.g., by communicating with the name node 202 of the distributed storage system 200, as described above.

The request staging table 304 may act as a temporary holding area to prepare data purge requests for efficient processing, e.g., parallel batch processing. The request staging table 304 may be used as an optimization point to improve throughput and performance, as is further described below with reference to FIG. 4. After purging, successfully completed requests are automatically moved by the purge request handling system 128 to the completed request table 306, while failed requests are retained in the request staging table 304. This enables the purging engine 130 to retry failed requests, as further described below.

In some examples, the use of separate tables may minimize or reduce the number of relatively expensive write operations required to process data purge requests, particularly in the context of a distributed storage system such as an HDFS, while ensuring scalability, as well as correct and efficient handling. The use of separate tables may also reduce or avoid fragmentation that could result from modifying main data files (e.g., the data 308) directly. For example, the purging engine 130 may initiate "surgical" deletions of custom data from the distributed storage system 200 in a targeted manner, while the data purge requests are handled separately, e.g., in smaller tables that do not directly modify the main data files.

The user device 106 may access a monitoring GUI 310 provided by the purge request handling system 128. For example, the user device 106 may access the monitoring GUI 310 via the web interface 134 or the app interface 136. The monitoring GUI 310 may aggregate information from the raw request table 302, the request staging table 304, and the completed request table 306 to provide the user 132 with a dashboard indicating the status of various data purge requests. In some examples, instead of or in addition to the user 132 accessing the monitoring GUI 310, it may be accessed by the administrator 112 using the user device 114.

For example, if the purge request handling system 128 finds a first data purge request in the raw request table 302 and a second data purge request in the completed request table 306, it may present, via the monitoring GUI 310, details of the first data purge request and the second data purge request, including an indication that the first data purge request has not yet been processed, and the second data purge request has been successfully processed. Further details of the monitoring GUI 310, according to some examples, are described below with reference to FIG. 6.

The modular architecture as shown in FIG. 3 may integrate easily with existing purging engines and distributed storage systems. In some examples, at least some of the components shown in FIG. 3 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 4:
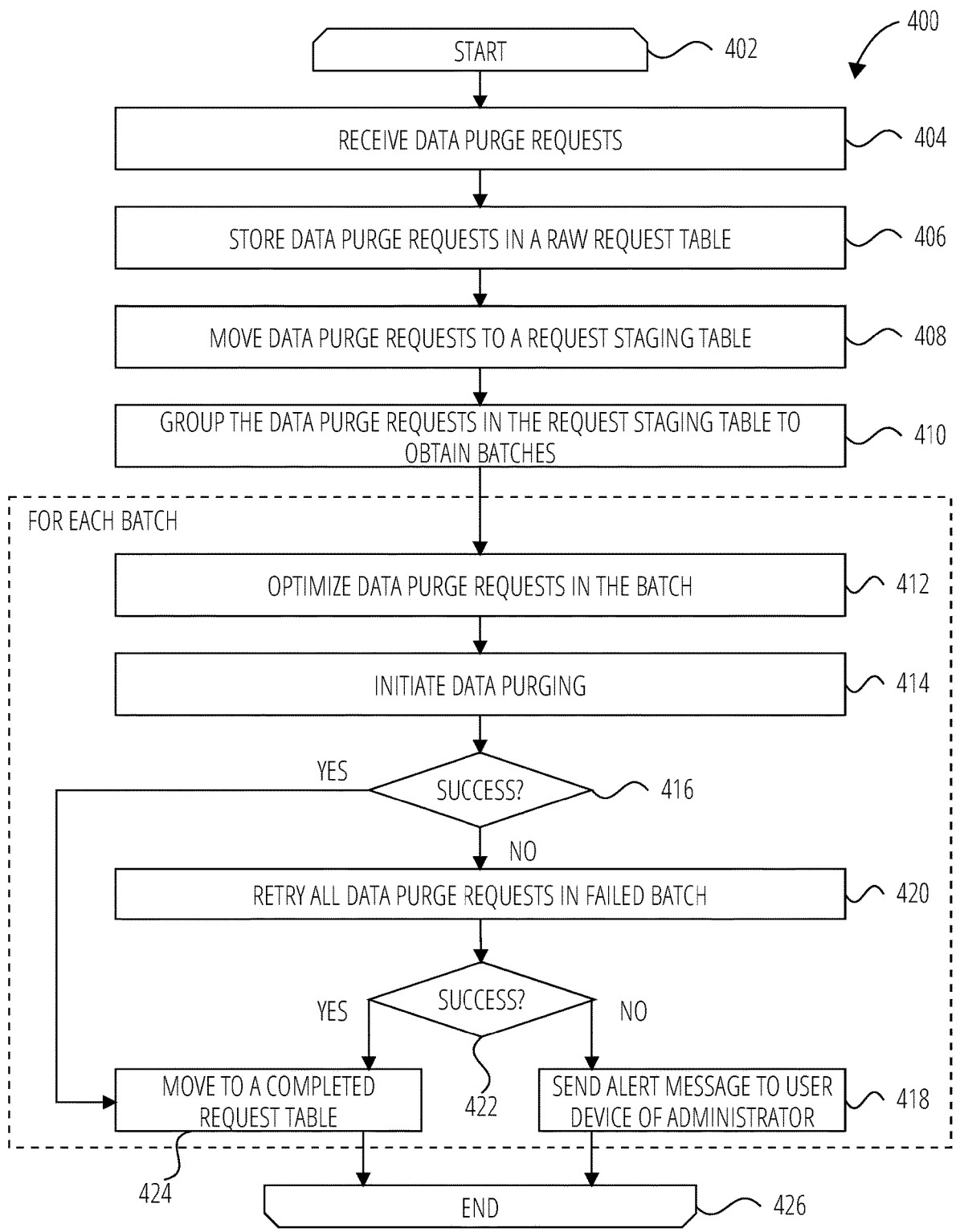
FIG. 4 is a flowchart illustrating operations of a method suitable for handling data purge requests, according to some examples.

FIG. 4 is a flowchart illustrating operations of a method 400 suitable for handling data purge requests, according to some examples. Aspects of the method 400 may be performed by components, devices, systems, data structures, interfaces, or entities shown in FIGS. 1 to 3. Accordingly, by way of example and not limitation, the method 400 is described with reference to certain elements of FIGS. 1-3. Further, while some operations are described as being performed with respect to a batch of data purge requests, it shall be appreciated that similar operations may be performed with respect to an individual data purge request that is not necessarily part of a batch.

The method 400 commences at opening loop element 402 and proceeds to operation 404, where the purge request handling system 128 receives a plurality of data purge requests. Each data purge request may relate to different data items or data sets in the distributed storage system 200, e.g., data meeting certain criteria, data belonging to certain user modules, specific types or formats of data, or combinations thereof. The purge request handling system 128 may receive the data purge requests from the user device 106 of the user 132. The data purge requests are stored in the raw request table 302 at operation 406.

At operation 408, the purge request handling system 128 moves the data purge requests to the request staging table 304. In the request staging table 304, the purge request handling system 128 may group or batch subsets of data purge requests together (operation 410). For example, the purge request handling system 128 may be configured to group the data purge requests by common features or based on the value of a particular field.

As an example, the purge request handling system 128 may group data purge requests with similar timestamps together in a batch. As another example, the purge request handling system 128 may group data purge requests relating to the same user module (e.g., human resources module) together in a batch. As a further example, the purge request handling system 128 may detect that there are dependencies or relationships between data to be purged in a first data purge request and data to be purged in a second data purge request and group such requests in the same batch.

In this way, the data purge requests stored in the request staging table 304 are divided into multiple parts, with each part defining a batch for processing. For example, the data purge requests may be grouped into 30, 50, 100, or 1000 batches. The purging engine 130 may then execute batches concurrently or partially concurrently. This allows for parallel processing of at least some of the data purge requests to improve purging efficiency.

Referring now to operation 412, within a batch, the purge request handling system 128 may further optimize the data purge requests prior to processing, e.g., by combining or merging one or more of the data purge requests. As an example, a first data purge request may be a request to purge all data in a particular module stored prior to Jun. 30, 2023, while a second data purge request may be a request to purge all data in the same module stored prior to May 30, 2023. As the first data purge request fully covers the second data purge request, the latter is redundant. Accordingly, the purge request handling system 128 may detect that the second data purge request is redundant based on the first data purge request, and perform optimization by merging the two requests before the purging engine 130 processes them, by simply removing the second data purge request, or by flagging the second data purge request such that it will be designated as completed once the first data purge request has been completed.

As another example, the purge request handling system 128 may optimize the data purge requests by merging data purge requests with overlapping scope. In this way, the requests may be processed as a single request to improve purging speed or efficiency.

At operation 414, the purging engine 130 initiates purging of the data associated with a particular batch. The purging engine 130 may process data purge requests within a batch in parallel, and may also, in some examples, process batches in parallel. The purging engine 130 or the purge request handling system 128 may adaptively control a level of parallel processing based on purging resource utilization. For example, the purging engine 130 may monitor a system load. If more resources become available, the purging engine 130 may increase a process size (e.g., to take 20 batches at the same time instead of 10), while if resources become more constrained, the purging engine 130 may reduce process size.

At decision operation 416, the purge request handling system 128 checks whether the batch was processed successfully by the purging engine 130. If the batch was processed successfully, the purge request handling system 128 moves the batch to the completed request table 306 (operation 424). If the batch was not processed successfully, the batch is retained in the request staging table 304 by the purge request handling system 128, and the purging engine 130 proceeds to retry processing of each data purge request in the batch (operation 420). In some examples, the purging engine 130 proceeds with retry operations once all batches in the request staging table 304 have completed their initial purging run.

In some examples, the purging engine 130 only retries a purging operation a predetermined number of times in order to save computing resources. For example, the purging engine 130 may only perform a retry once per request. At decision operation 422, the purge request handling system 128 checks whether the retry operation was successful for each data purge request in the batch. Where a data purge request remaining in the request staging table 304 is then successfully processed, it is moved to the completed request table 306 (operation 424).

If the retry fails for a particular data purge request, the purge request handling system 128 is notified of the failure by or via the purging engine 130, and the purge request handling system 128 proceeds to send an alert message to the user device 114 of the administrator 112, at operation 418. For example, the alert message may inform the administrator 112 of the failure to process the particular request and indicate that the administrator 112 should investigate the root cause of the failure and complete the purging manually.

The purge request handling system 128 may identify the retry failure through a direct notification from the purge request handling system 128 or from the relevant record in the request staging table 304. For example, if the retry fails, the purging engine 130 may cause the record for the relevant data purge request to be updated, e.g., by adding a failure flag thereto. In this way, the purge request handling system 128 can, when accessing the request staging table 304, distinguish between data purge requests in the processing stage that are still in progress and other data purge requests in the processing stage that have "failed" and require administrator intervention.

In some examples, once the administrator 112 has manually completed the purging, the purge request handling system 128 is notified (e.g., by way of a message transmitted by the user device 114) or checks the distributed storage system 200 to confirm successful completion, and moves the relevant request to the completed request table 306. Where the administrator 112 is a human, save for any involvement of the administrator 112, the operations in the method 400 may operate fully automatically without requiring human intervention. The method 400 concludes at closing loop element 426.

The multi-table or multi-stage approach described herein may reduce overhead associated with write operations, e.g., in HDFS implementations, by avoiding or reducing the updating of existing data files (other than the tables). Instead of relatively expensive in-place write operations, purge requests may be added or appended to, and moved between, the separately stored tables.

In some examples, the requests are staged through the tables to avoid or reduce repetitive write operations for each individual data purge request. Write operations may be substantially confined to the smaller metadata tables, rather than larger files targeted for purging. Batching or optimization may further decrease the number of writes required to process a request.

Figure 5:
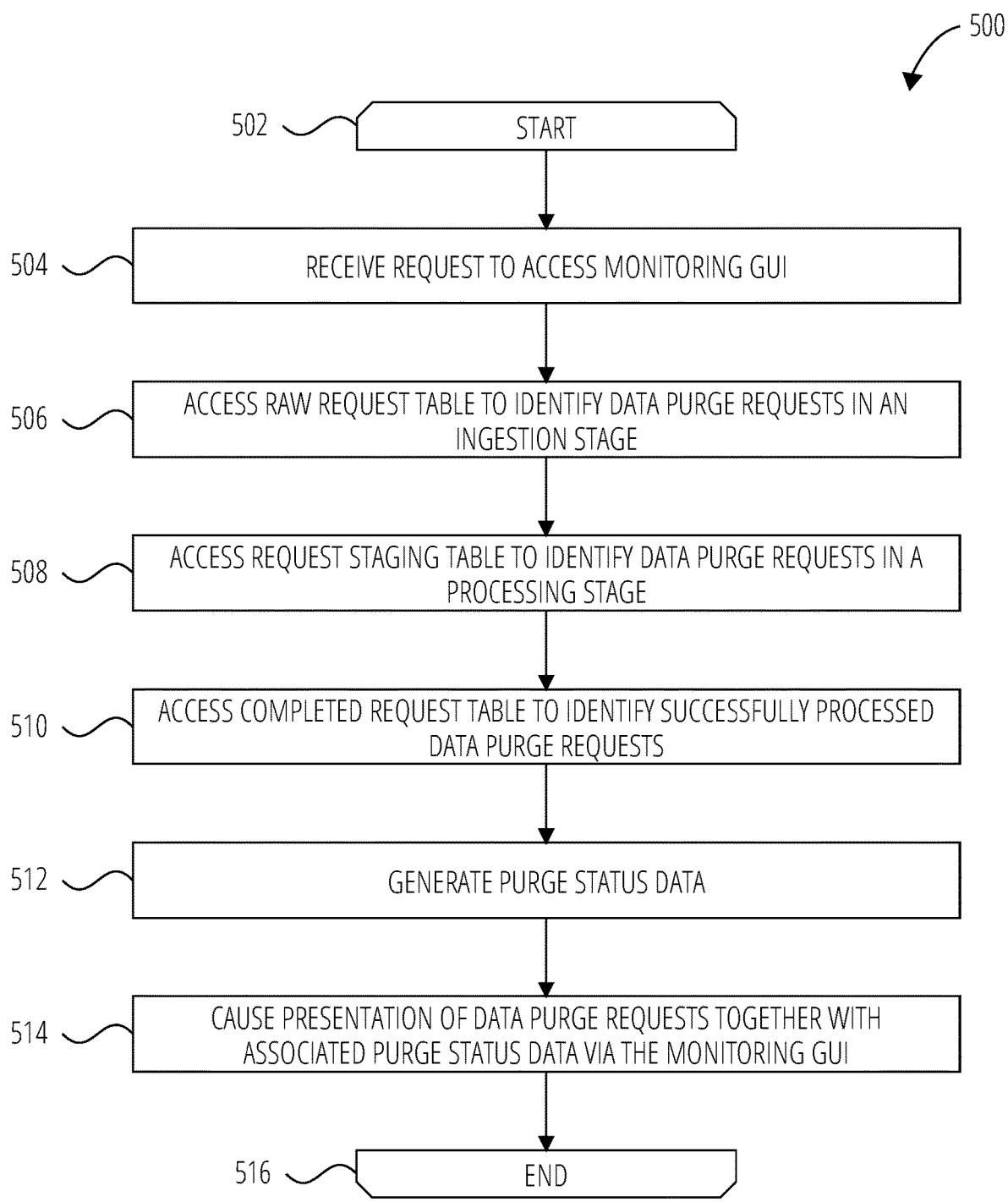
FIG. 5 is a flowchart illustrating operations of a method suitable for generating purge status data and presenting the purge status data via a user interface, according to some examples.

FIG. 5 is a flowchart illustrating operations of a method 500 suitable for generating purge status data and presenting the purge status data via a user interface, according to some examples. Aspects of the method 500 may be performed by components, devices, systems, data structures, interfaces, or entities shown in FIGS. 1 to 3. Accordingly, by way of example and not limitation, the method 500 is described with reference to certain elements of FIGS. 1-3.

The method 500 commences at opening loop element 502 and proceeds to operation 504, where the purge request handling system 128 receives a request, e.g., from the user device 106, to access the monitoring GUI 310. The purge request handling system 128 accesses the raw request table 302, the request staging table 304, and the completed request table 306 to obtain status information.

Specifically, in the method 500 of FIG. 5, the purge request handling system 128 accesses the raw request table 302 to identify data purge requests (if any) that are in the ingestion stage (operation 506), accesses the request staging table 304 to identify data purge requests (if any) in the processing stage (operation 508), and accesses the completed request table 306 to identify data purge requests (if any) that have been successfully processed (operation 510).

At operation 512, the purge request handling system 128 then generates purge status data based on where each data purge request is located (e.g., in the raw request table 302, in the request staging table 304, or in the completed request table 306). In some cases, the purge request handling system 128 may check more granular detail within a particular table. For example, and as mentioned, the purge request handling system 128 may be configured to identify two types of data purge requests in the processing stage. This may be regarded as two "sub-statuses" of the "processing stage" status. For example, where the purging engine 130 has not completed processing of a data purge request, the data purge request status may be "in progress," while a data purge request that the purging engine 130 has attempted to process (e.g., including a retry operation), but failed, may have a "failed" status. In both cases, the request is still in the processing stage as it remains in the request staging table 304.

As mentioned, in some examples, there is no duplication between the records in the data structures (e.g., tables) used for request processing. For example, once a request has been successfully processed, it may disappear from the request staging table 304 and automatically appear in the completed request table 306. This enables the purge request handling system 128 to determine the status of a request based on the data structure in which it is located at a given point in time.

The method 500 then proceeds to operation 514, where the purge request handling system 128 causes presentation of the data purge requests found in the raw request table 302, the request staging table 304, and the completed request table 306, together with associated purge status data, via the monitoring GUI 310. It will be appreciated that the monitoring GUI 310 may be dynamically updated to reflect changes, e.g., new requests that are added, or changes in the statuses of requests. The method 500 concludes at closing loop element 516.

Figure 6:
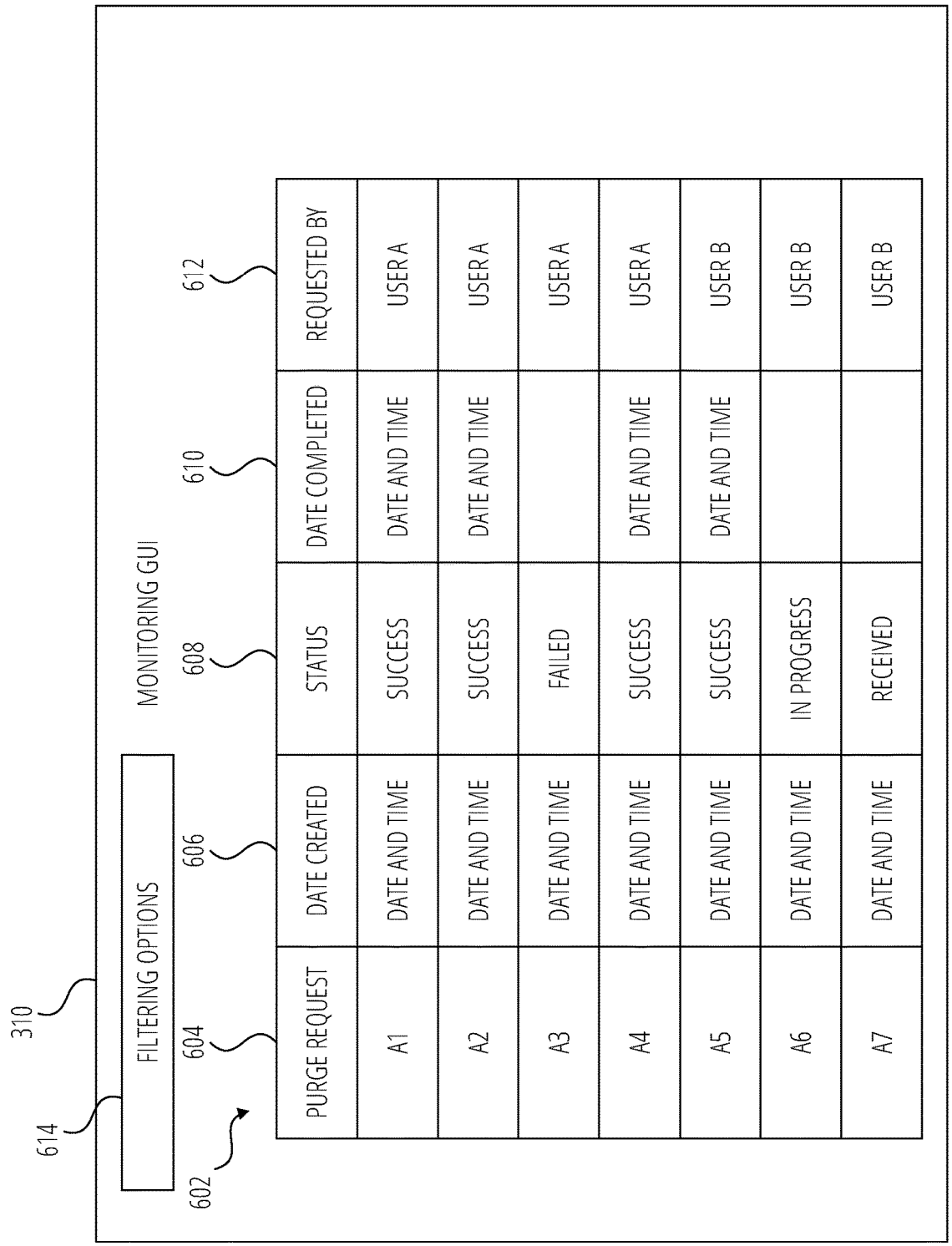
FIG. 6 is a user interface diagram illustrating aspects of a monitoring graphical user interface (GUI), according to some examples.

FIG. 6 is a user interface diagram illustrating aspects of the monitoring GUI 310, according to some examples. As mentioned, the monitoring GUI 310 may be presented at the user device 106 of the user 132 or the user device 114 of the administrator 112. For example, the monitoring GUI 310 may be presented on a display of a computing device, such as a mobile phone or a laptop computer. However, the monitoring GUI 310 may also be presented via other types of displays or on other types of devices.

As described above, in some examples, all requests that are in the ingestion stage (e.g., they are not being grouped or optimized yet, and have not been sent to the purging engine 130) may be located in the raw request table 302, all requests that are being processed (e.g., being handled by the purging engine 130, being grouped or optimized for processing (this may be regarded as pre-processing), or waiting to be picked up by the purging engine 130) may be located in the request staging table 304, and all requests that have been successfully processed may be located in the completed request table 306. The monitoring GUI 310 may provide a web page or application page that is configured to read data from each table 302, 304, 306 to identify the status of the processing of each request.

Referring now specifically to FIG. 6, the monitoring GUI 310 is shown to present a status table 602. The status table 602 shows, for each data purge request ("A1" to "A7"), a purge request identifier column 604, a date created column 606, a status column 608, a date completed column 610, and a requested by column 612.

The purge request identifier column 604 provides a unique identifier for each data purge request. The date created column 606 may identify the time and date of submission or creation of the relevant data purge request, or, for example, the date of ingestion into the raw request table 302. The status column 608 provides the status of the relevant data purge request, e.g., as determined using techniques described herein.

For example, in FIG. 6, the purge request "A1" has a "success" status, which indicates that the request was found in the completed request table 306 (e.g., the purging engine 130 successfully completed its processing). The purge request "A7" has a "received" status, which indicates that the request was found in the raw request table 302 (e.g., the request has been received by the purge request handling system 128 but no processing steps have commenced). The request "A7" is thus in the ingestion stage.

Further, in FIG. 6, the purge request "A6" has an "in progress" status, which indicates that the request was found in the request staging table 304, but has not been found with a "failed" flag or indicator. As a final example, the purge request "A3" has a "failed" status, which indicates that the request also found in the request staging table 304, but has been found with a "failed" flag or indicator due to the purging engine 130 having failed to complete processing (e.g., after an initial run and a retry operation). The requests "A3" and "A6" are thus both in the processing stage, but have different "sub-statuses," as described above.

The date completed column 610 may identify the time and date of completion of a successful request. For example, the date completed column 610 may be the time and date at which the request was moved to the completed request table 306. Finally, the requested by column 612 identifies a requestor. For example, "User A" may be the user 132 of the user device 106, while "User B" may be the administrator 112 using the user device 114. In some cases, and as mentioned above, purges may be requested by automated components.

A user of the monitoring GUI 310 may select one or more filtering options 614 to filter records shown in the status table 602. For example, the filtering options 614 may enable the user to filter the records by date, by status, or by requestor. The monitoring GUI 310 thus enables convenient auditing and tracking of the purge process.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: storing a plurality of data purge requests in a first data structure, the plurality of data purge requests being grouped based on at least one feature to obtain batches of data purge requests; causing the batches to be processed at least partially in parallel; responsive to detecting successful processing of a first data purge request from the plurality of data purge requests, moving the first data purge request from the first data structure to a second data structure; responsive to detecting unsuccessful processing of a second data purge request from the plurality of data purge requests, retaining the second data purge request in the first data structure; generating purge status data based on the first data purge request being in the second data structure and the second data purge request being in the first data structure; and causing presentation of the purge status data at a user device.

In Example 2, the subject matter of Example 1 includes, wherein the purge status data comprises a status of the first data purge request and a status of the second data purge request, the operations further comprising: accessing the second data structure to identify the status of the first data purge request; and accessing the first data structure to identify the status of the second data purge request.

In Example 3, the subject matter of any of Examples 1-2 includes, the operations further comprising: responsive to the retaining of the second data purge request in the first data structure, causing processing of the second data purge request to be retried.

In Example 4, the subject matter of Example 3 includes, the operations further comprising: detecting that the retrying of the processing of the second data purge request failed a predetermined number of times; and responsive to the detecting that the retrying of the processing of the second data purge request failed the predetermined number of times, causing transmission of a message indicating that the processing of the second data purge request failed.

In Example 5, the subject matter of any of Examples 1-4 includes, wherein the first data structure is a first table and the second data structure is a second table, the first table and the second table being stored in a distributed storage system.

In Example 6, the subject matter of Example 5 includes, wherein the distributed storage system comprises a HDFS.

In Example 7, the subject matter of any of Examples 2-6 includes, wherein the first data structure stores data purge requests that are in a processing stage, the second data structure stores successfully processed data purge requests, the status of the first data purge request indicates the successful processing of the first data purge request, and the status of the second data purge request indicates that the second data purge request is in the processing stage.

In Example 8, the subject matter of Example 7 includes, wherein a third data structure stores data purge requests that are in an ingestion stage, the operations further comprising: accessing the third data structure to identify a status of a third data purge request, the purge status data further comprising the status of the third data purge request.

In Example 9, the subject matter of Example 8 includes, the operations further comprising, prior to the storing of the plurality of data purge requests in the first data structure: receiving the plurality of data purge requests; storing the plurality of data purge requests in the third data structure; and moving the plurality of data purge requests from the third data structure to the first data structure for processing.

In Example 10, the subject matter of any of Examples 1-9 includes, the operations further comprising: in the first data structure, merging two or more data purge requests from the plurality of data purge requests prior to the processing of the batches.

In Example 11, the subject matter of Example 10 includes, wherein the merging of the two or more data purge requests comprises: detecting that a fourth data purge request from the plurality of data purge requests is redundant based on a fifth data purge request from the plurality of data purge requests; and responsive to the detecting that the fourth data purge request is redundant based on the fifth data purge request, merging the fourth data purge request and the fifth data purge request.

In Example 12, the subject matter of any of Examples 1-11 includes, a purging engine to execute, in a distributed storage system, purging of data associated with respective data purge requests from the plurality of data purge requests, wherein the detecting of the unsuccessful processing of the second data purge request comprises detecting that the purging engine failed to successfully purge data identified by the second data purge request from the distributed storage system.

In Example 13, the subject matter of any of Examples 1-12 includes, wherein the causing of the batches to be processed at least partially in parallel comprises adaptively controlling a level of parallel processing of the batches based on purging resource utilization.

In Example 14, the subject matter of any of Examples 1-13 includes, wherein the causing of the presentation of the purge status data comprises: providing a monitoring GUI to present the purge status data.

Example 15 is a method comprising: storing a plurality of data purge requests in a first data structure, the plurality of data purge requests being grouped based on at least one feature to obtain batches of data purge requests; causing the batches to be processed at least partially in parallel; responsive to detecting successful processing of a first data purge request from the plurality of data purge requests, moving the first data purge request from the first data structure to a second data structure; responsive to detecting unsuccessful processing of a second data purge request from the plurality of data purge requests, retaining the second data purge request in the first data structure; generating purge status data based on the first data purge request being in the second data structure and the second data purge request being in the first data structure; and causing presentation of the purge status data at a user device.

In Example 16, the subject matter of Example 15 includes, wherein the purge status data comprises a status of the first data purge request and a status of the second data purge request, the method further comprising: accessing the second data structure to identify the status of the first data purge request; and accessing the first data structure to identify the status of the second data purge request.

In Example 17, the subject matter of any of Examples 15-16 includes, responsive to the retaining of the second data purge request in the first data structure, causing processing of the second data purge request to be retried.

Example 18 is a non-transitory computer-readable medium that stores instructions that, when executed by one or more processors, cause the one or more processors to perform operations comprising: storing a plurality of data purge requests in a first data structure, the plurality of data purge requests being grouped based on at least one feature to obtain batches of data purge requests; causing the batches to be processed at least partially in parallel; responsive to detecting successful processing of a first data purge request from the plurality of data purge requests, moving the first data purge request from the first data structure to a second data structure; responsive to detecting unsuccessful processing of a second data purge request from the plurality of data purge requests, retaining the second data purge request in the first data structure; generating purge status data based on the first data purge request being in the second data structure and the second data purge request being in the first data structure; and causing presentation of the purge status data at a user device.

In Example 19, the subject matter of Example 18 includes, wherein the purge status data comprises a status of the first data purge request and a status of the second data purge request, the operations further comprising: accessing the second data structure to identify the status of the first data purge request; and accessing the first data structure to identify the status of the second data purge request.

In Example 20, the subject matter of any of Examples 18-19 includes, the operations further comprising: responsive to the retaining of the second data purge request in the first data structure, causing processing of the second data purge request to be retried.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
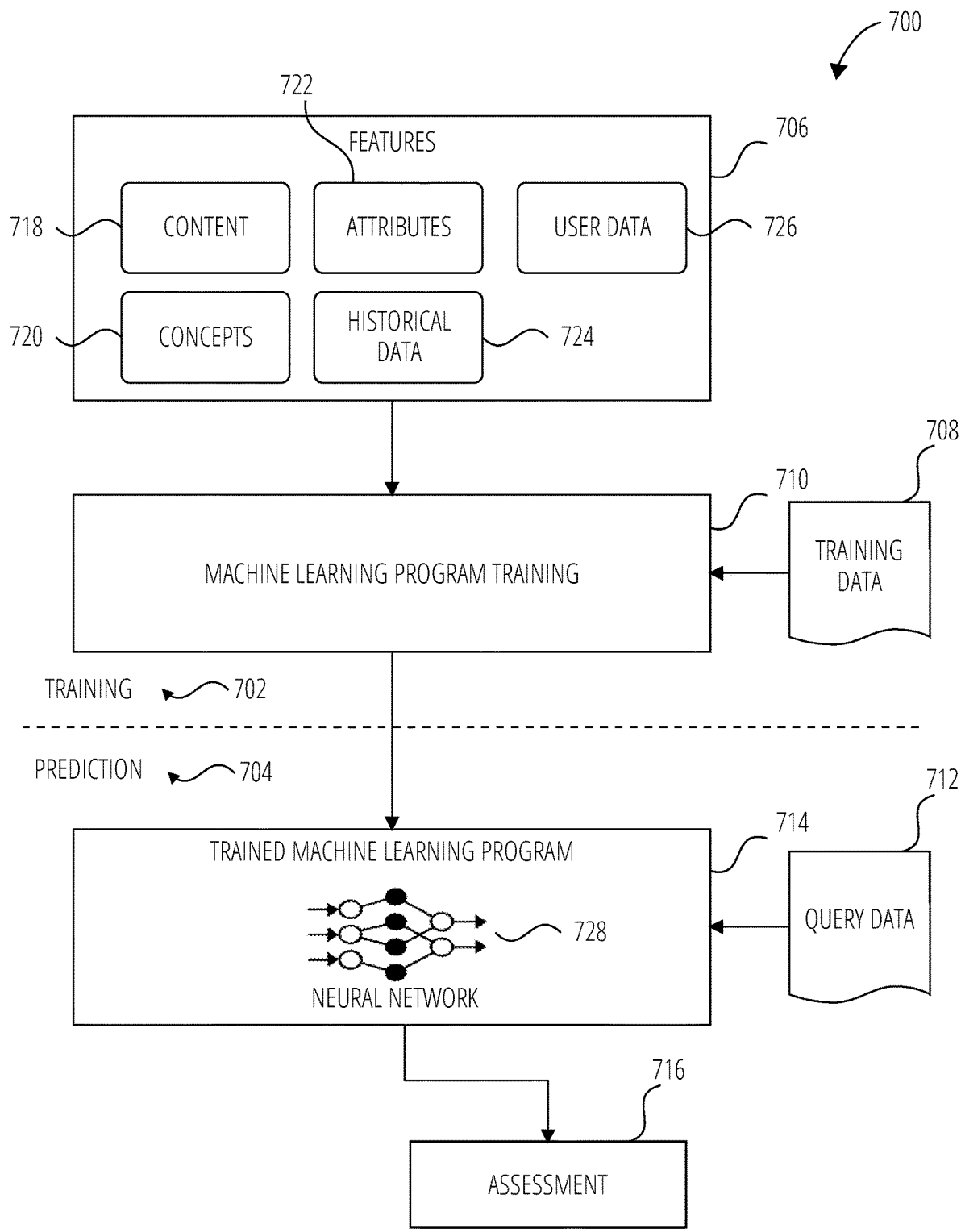
FIG. 7 diagrammatically illustrates training and use of a machine learning program, according to some examples.

FIG. 7 is a block diagram showing a machine learning program 700, according to some examples. Machine learning programs, also referred to as machine learning algorithms or tools, may be used as part of the systems described herein to perform one or more operations. For example, and without limitation, machine learning tools may be used to batch data purge requests, optimize data purge requests (e.g., identify requests that can be merged prior to processing), detect purging errors, or predict causes of errors.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 708 in order to make data-driven predictions or decisions expressed as outputs or assessments (e.g., assessment 716). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), transformers, matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 700 supports two types of phases, namely training phases 702 and prediction phases 704. In training phases 702, supervised learning, unsupervised or reinforcement learning may be used. For example, the machine learning program 700 (1) receives features 706 (e.g., as structured or labeled data in supervised learning) and/or (2) identifies features 706 (e.g., unstructured or unlabeled data for unsupervised learning) in training data 708. In prediction phases 704, the machine learning program 700 uses the features 706 for analyzing query data 712 to generate outcomes or predictions, as examples of an assessment 716.

In the training phase 702, feature engineering is used to identify features 706 and may include identifying informative, discriminating, and independent features for the effective operation of the machine learning program 700 in pattern recognition, classification, and regression. In some examples, the training data 708 includes labeled data, which is known data for pre-identified features 706 and one or more outcomes. Each of the features 706 may be a variable or attribute, such as individual measurable property of a process, article, system, or phenomenon represented by a data set (e.g., the training data 708). Features 706 may also be of different types, such as numeric features, strings, and graphs, and may include one or more of content 718, concepts 720, attributes 722, historical data 724 and/or user data 726, merely for example.

The concept of a feature in this context is related to that of an explanatory variable used in statistical techniques such as linear regression. Choosing informative, discriminating, and independent features is important for the effective operation of the machine learning program 700 in pattern recognition, classification, and regression. Features may be of different types, such as numeric features, strings, and graphs.

In training phases 702, the machine learning program 700 uses the training data 708 to find correlations among the features 706 that affect a predicted outcome or assessment 716. With the training data 708 and the identified features 706, the machine learning program 700 is trained during the training phase 702 at machine learning program training 710. The machine learning program 700 appraises values of the features 706 as they correlate to the training data 708. The result of the training is the trained machine learning program 714 (e.g., a trained or learned model).

Further, the training phases 702 may involve machine learning, in which the training data 708 is structured (e.g., labeled during pre-processing operations), and the trained machine learning program 714 implements a relatively simple neural network 728 capable of performing, for example, classification and clustering operations. In other examples, the training phase 702 may involve deep learning, in which the training data 708 is unstructured, and the trained machine learning program 714 implements a deep neural network 728 that is able to perform both feature extraction and classification/clustering operations.

A neural network 728 generated during the training phase 702, and implemented within the trained machine learning program 714, may include a hierarchical (e.g., layered) organization of neurons. For example, neurons (or nodes) may be arranged hierarchically into a number of layers, including an input layer, an output layer, and multiple hidden layers. Each of the layers within the neural network 728 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 728 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example.

During prediction phases 704, the trained machine learning program 714 is used to perform an assessment. Query data 712 is provided as an input to the trained machine learning program 714, and the trained machine learning program 714 generates the assessment 716 as output, responsive to receipt of the query data 712.

Figure 8:
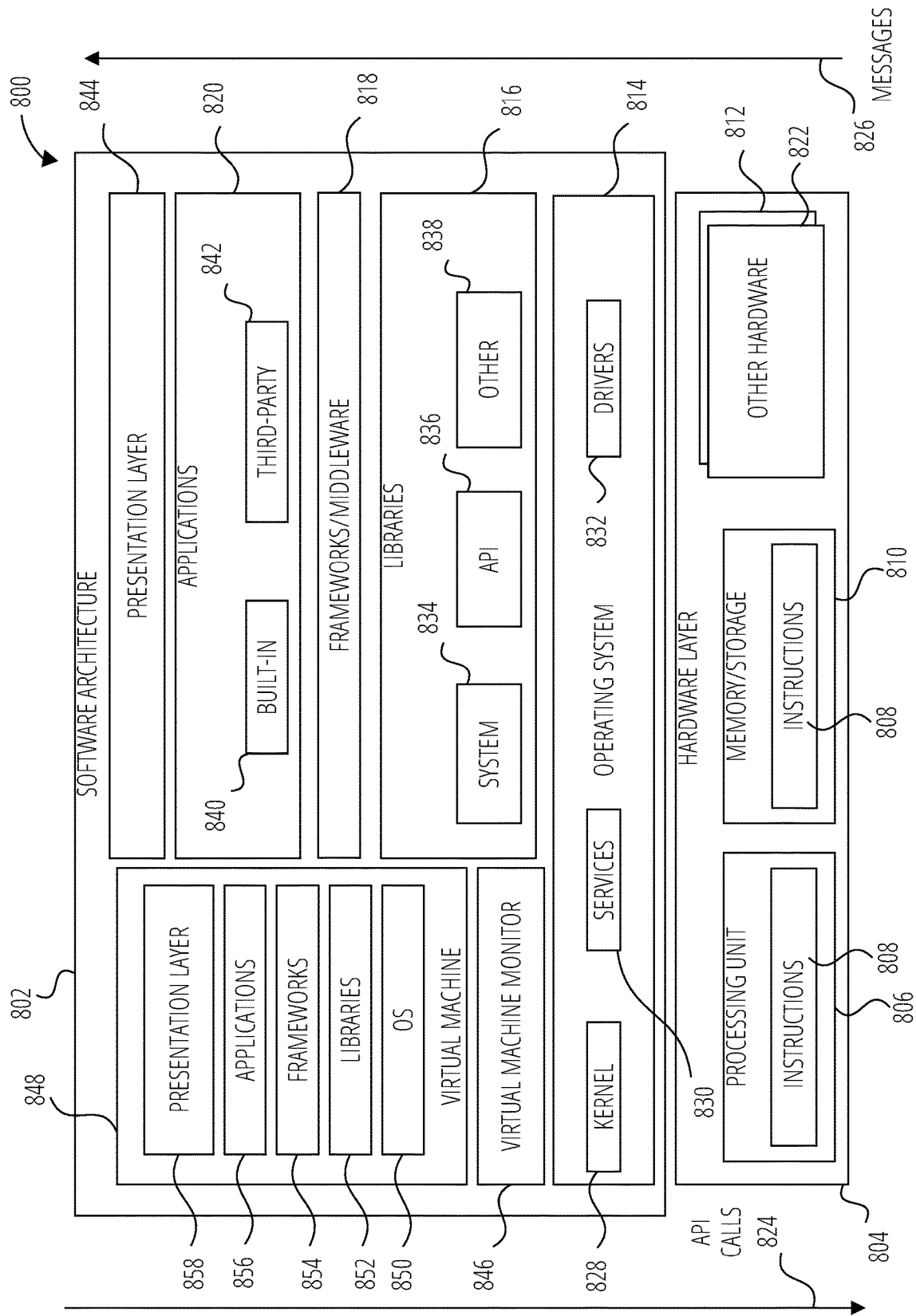
FIG. 8 is a block diagram showing a software architecture for a computing device, according to some examples.

FIG. 8 is a block diagram 800 showing a software architecture 802 for a computing device, according to some examples. The software architecture 802 may be used in conjunction with various hardware architectures, for example, as described herein. FIG. 8 is merely a non-limiting illustration of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 and other hardware 822 which represent any other hardware of the hardware layer 804, such as the other hardware illustrated as part of the software architecture 802.

In the architecture of FIG. 8, the software architecture 802 may be conceptualized as a stack of layers where each layer provides particular functionality. For example, the software architecture 802 may include layers such as an operating system 814, libraries 816, frameworks/middleware layer 818, applications 820, and presentation layer 844.

Operationally, the applications 820 or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830 or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware layer 818 may provide a higher-level common infrastructure that may be utilized by the applications 820 or other software components/modules. For example, the frameworks/middleware layer 818 may provide various graphic user interface (GUI) functions, high-level resource management, high-level location services, and so forth. The frameworks/middleware layer 818 may provide a broad spectrum of other APIs that may be utilized by the applications 820 or other software components/modules, some of which may be specific to a particular operating system or platform.

The applications 820 include built-in applications 840 or third-party applications 842. Examples of representative built-in applications 840 may include, but are not limited to, a contacts application, a browser application, a book reader application, a location application, a media application, a messaging application, or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system libraries 834, API libraries 836, and other libraries 838), and frameworks/middleware layer 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 9:
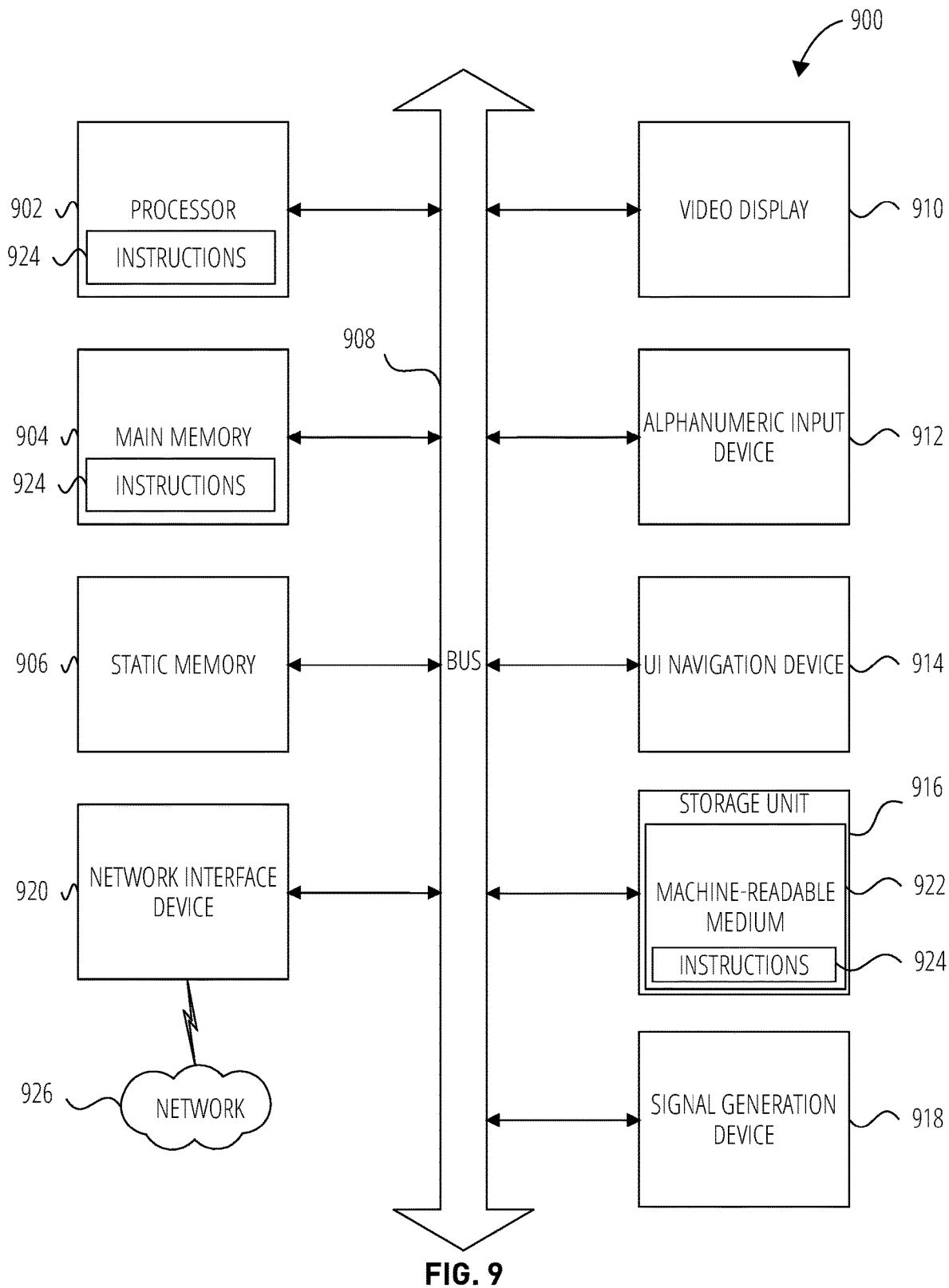
FIG. 9 is a block diagram of a machine in the form of a computer system, according to some examples, within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a GPU, or both), a primary or main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a storage unit 916, a signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 or within the processor 902 during execution thereof by the computer system 900, with the main memory 904 and the processor 902 also each constituting a machine-readable medium 922.

While the machine-readable medium 922 is shown in accordance with some examples to be a single medium, the term "machine-readable medium" may include a single medium or multiple media (e.g., a centralized or distributed database, or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of a machine-readable medium 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. As used herein, the conjunction "or" refers to a non-exclusive "or," unless specifically stated otherwise.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
    at least one memory that stores instructions; and
    one or more processors configured by the instructions to perform operations comprising:
        storing a plurality of data purge requests in a first data structure, the plurality of data purge requests being grouped based on at least one feature to obtain batches of data purge requests;
        causing the batches to be processed at least partially in parallel;
        responsive to detecting successful processing of a first data purge request from the plurality of data purge requests, moving the first data purge request from the first data structure to a second data structure;
        responsive to detecting unsuccessful processing of a second data purge request from the plurality of data purge requests, retaining the second data purge request in the first data structure;
        generating purge status data based on the first data purge request being in the second data structure and the second data purge request being in the first data structure; and
        causing presentation of the purge status data at a user device.

2. The system of claim 1, wherein the purge status data comprises a status of the first data purge request and a status of the second data purge request, the operations further comprising:
    accessing the second data structure to identify the status of the first data purge request; and
    accessing the first data structure to identify the status of the second data purge request.

3. The system of claim 1, the operations further comprising:
    responsive to the retaining of the second data purge request in the first data structure, causing processing of the second data purge request to be retried.

4. The system of claim 3, the operations further comprising:
    detecting that the retrying of the processing of the second data purge request failed a predetermined number of times; and
    responsive to the detecting that the retrying of the processing of the second data purge request failed the predetermined number of times, causing transmission of a message indicating that the processing of the second data purge request failed.

5. The system of claim 1, wherein the first data structure is a first table and the second data structure is a second table, the first table and the second table being stored in a distributed storage system.

6. The system of claim 5, wherein the distributed storage system comprises a Hadoop Distributed File System (HDFS).

7. The system of claim 2, wherein the first data structure stores data purge requests that are in a processing stage, the second data structure stores successfully processed data purge requests, the status of the first data purge request indicates the successful processing of the first data purge request, and the status of the second data purge request indicates that the second data purge request is in the processing stage.

8. The system of claim 7, wherein a third data structure stores data purge requests that are in an ingestion stage, the operations further comprising:
accessing the third data structure to identify a status of a third data purge request, the purge status data further comprising the status of the third data purge request.

9. The system of claim 8, the operations further comprising, prior to the storing of the plurality of data purge requests in the first data structure:
receiving the plurality of data purge requests;
storing the plurality of data purge requests in the third data structure; and
moving the plurality of data purge requests from the third data structure to the first data structure for processing.

10. The system of claim 1, the operations further comprising:
in the first data structure, merging two or more data purge requests from the plurality of data purge requests prior to the processing of the batches.

11. The system of claim 10, wherein the merging of the two or more data purge requests comprises:
detecting that a fourth data purge request from the plurality of data purge requests is redundant based on a fifth data purge request from the plurality of data purge requests; and
responsive to the detecting that the fourth data purge request is redundant based on the fifth data purge request, merging the fourth data purge request and the fifth data purge request.

12. The system of claim 1, further comprising:
a purging engine to execute, in a distributed storage system, purging of data associated with respective data purge requests from the plurality of data purge requests, wherein the detecting of the unsuccessful processing of the second data purge request comprises detecting that the purging engine failed to successfully purge data identified by the second data purge request from the distributed storage system.

13. The system of claim 1, wherein the causing of the batches to be processed at least partially in parallel comprises adaptively controlling a level of parallel processing of the batches based on purging resource utilization.

14. The system of claim 1, wherein the causing of the presentation of the purge status data comprises:
providing a monitoring graphical user interface to present the purge status data.

15. A method comprising:
storing a plurality of data purge requests in a first data structure, the plurality of data purge requests being grouped based on at least one feature to obtain batches of data purge requests;
causing the batches to be processed at least partially in parallel;
responsive to detecting successful processing of a first data purge request from the plurality of data purge requests, moving the first data purge request from the first data structure to a second data structure;
responsive to detecting unsuccessful processing of a second data purge request from the plurality of data purge requests, retaining the second data purge request in the first data structure;
generating purge status data based on the first data purge request being in the second data structure and the second data purge request being in the first data structure; and
causing presentation of the purge status data at a user device.

16. The method of claim 15, wherein the purge status data comprises a status of the first data purge request and a status of the second data purge request, the method further comprising:
accessing the second data structure to identify the status of the first data purge request; and
accessing the first data structure to identify the status of the second data purge request.

17. The method of claim 15, further comprising:
responsive to the retaining of the second data purge request in the first data structure, causing processing of the second data purge request to be retried.

18. A non-transitory computer-readable medium that stores instructions that, when executed by one or more processors, cause the one or more processors to perform operations comprising:
storing a plurality of data purge requests in a first data structure, the plurality of data purge requests being grouped based on at least one feature to obtain batches of data purge requests;
causing the batches to be processed at least partially in parallel;
responsive to detecting successful processing of a first data purge request from the plurality of data purge requests, moving the first data purge request from the first data structure to a second data structure;
responsive to detecting unsuccessful processing of a second data purge request from the plurality of data purge requests, retaining the second data purge request in the first data structure;
generating purge status data based on the first data purge request being in the second data structure and the second data purge request being in the first data structure; and
causing presentation of the purge status data at a user device.

19. The non-transitory computer-readable medium of claim 18, wherein the purge status data comprises a status of the first data purge request and a status of the second data purge request, the operations further comprising:
accessing the second data structure to identify the status of the first data purge request; and
accessing the first data structure to identify the status of the second data purge request.

20. The non-transitory computer-readable medium of claim 18, the operations further comprising:
responsive to the retaining of the second data purge request in the first data structure, causing processing of the second data purge request to be retried.

* * * * *